United States Patent
Wooding (10) Patent No.: US 7,010,096 B1
(45) Date of Patent: Mar. 7, 2006

(54) REMOTE TESTING OF A COMMUNICATIONS LINE

(75) Inventor: Jeffrey Wooding, Parkdale (AU)

(73) Assignee: Teletech Pty., Ltd., Victoria (AU)

( * ) Notice: Subject to any disclaimer, the term of this patent is extended or adjusted under 35 U.S.C. 154(b) by 0 days.

(21) Appl. No.: 09/444,723

(22) Filed: Nov. 24, 1999

(51) Int. Cl.
*H04M 1/24* (2006.01)

(52) U.S. Cl. .................. 379/21; 379/27.02; 379/27.06

(58) Field of Classification Search ............... 379/5, 379/6, 21, 26, 27, 29, 1.01, 22.01, 22.02, 379/26.01, 27.02, 27.06; 327/538, 539, 643
See application file for complete search history.

(56) References Cited

U.S. PATENT DOCUMENTS

| | | | |
|---|---|---|---|
| 3,920,975 A | * | 11/1975 | Bass |
| 4,862,491 A | * | 8/1989 | La Salle et al. ............... 379/6 |
| 5,307,398 A | * | 4/1994 | Contonzo et al. ............. 379/21 |
| 5,343,461 A | * | 8/1994 | Barton et al. |
| 5,550,894 A | * | 8/1996 | Charland .................. 379/1.01 |
| 5,553,059 A | * | 9/1996 | Emerson et al. |
| 5,802,143 A | * | 9/1998 | Borchering et al. .......... 379/33 |
| 6,201,853 B1 | * | 3/2001 | Butler et al. .................. 379/21 |
| 6,212,258 B1 | * | 4/2001 | Bella et al. .............. 379/27.03 |

FOREIGN PATENT DOCUMENTS

EP 0880 258 A2 * 11/1998

* cited by examiner

*Primary Examiner*—Barry W Taylor
(74) *Attorney, Agent, or Firm*—Nixon & Vanderhye, PC (57) ABSTRACT

Apparatus and method for remotely measuring characteristics of a communications line (4) wherein a receiver unit (8) is connected a remote end of line (4) between conductors (10,12) of the line (4) and a sender unit (6) is connected to the other end of line (4) between conductors (10,12). On depressing a function key or button (22) on receiver unit (8) representative of a characteristic of line (4) to be measured, the receiver unit has a signal generator (26) which transmits a unique signal or code identifying the characteristic to the sender unit (6) along line (4). The sender unit (6) detects the unique signal and passes the signal to a microprocessor (32) which controls switching means (34) to connect the corresponding circuitry between conductors (10,12), based on the unique signal or code, to allow the characteristic to be measured.

44 Claims, 6 Drawing Sheets

FIG_2.

REMOTE TESTING OF A COMMUNICATIONS LINE

BACKGROUND OF THE INVENTION

1. Field of the Invention

This invention relates to a method of, and apparatus for, remotely testing a communications line, and more particularly to a method of, and apparatus for, testing a communications line to ascertain its suitability, under high frequency transmissions, for transmitting data at high bit rates.

2. Description of Related Art

There is a need to conduct tests and perform measurements on a communications line, including a telephone line, such as the characteristics of line loss, noise and resistance. This is so that the line's suitability for high frequency digital systems like pair gain, basic rate ISDN and Internet connections can be established. Generally, at high frequencies, the loss in signal magnitude is much higher than at low frequencies. For example, at 100 kHz, the line loss can be as much as 45 dB for a small pair gain system. This is primarily due to the increase in inductance on the line as frequency increases. A Plain Ordinary Telephone Service (POTS) line can often tolerate adverse transmission conditions caused by bridged taps, split pairs, poor joints and low insulation resistance. However, these conditions seriously affect the operation of high frequency digital systems and therefore must be identified.

Previously there has been no known method of measuring line loss and for performing all other necessary measurements remotely from the receiving end of a communications line. One arrangement has consisted in setting up identical measuring instruments one at each end of the line under test. Each instrument is very expensive and furthermore, switching of the instruments between different functions to be measured has to be performed manually. There is also known Australian Patent No. 604878, in the name of the applicant, which discloses a system for remotely disconnecting and short-circuiting a pair of conductors. However, the system disclosed therein does not facilitate remotely switching between a plurality of measurement functions such that the required circuit elements to enable such measurement are connected to the communications line at both ends of the line, that is, the sender end and the receiver end. The disclosed system only permits sequential switching between functions and does not allow for random switching from one function to another in order to connect circuitry across a communications line to enable a characteristic to be measured and/or tested.

SUMMARY OF THE INVENTION

According to a first aspect of the present invention there is provided an apparatus for remotely measuring characteristics of a communications line comprising:
  receiver means for connection to a remote end of the communications line;
  sender means for connection to the other end of the communications line;
  said receiver means generating a signal in response to a selection of one of a plurality of characteristics of said line to be measured;
  said signal uniquely representing said selected characteristic;
  said signal being transmitted along the communications line toward the sender means;
  said sender means having detection means for detecting said signal, and switching means;
  such that on detection of said signal and, on the basis of the unique representation of the signal, the switching means is controlled so as to connect predetermined circuitry across the line at said other end and at said remote end to enable a selected characteristic of the line to be measured.

Preferably, said signal is generated by signal generation means and is assigned a unique code, such as a sequence of pulses representing characteristics to be measured.

Preferably, when the signal is detected by said detection means, said signal is converted into a digital code and forwarded to a processing means, such as a microprocessor, which controls the switching means on the basis of the digital code representing the signal. Preferably, said switching means is in the form of a set of relays.

According to a second aspect there is provided a method of remotely measuring characteristics of a communications line, comprising the steps of:
  connecting receiver means to a remote end of the communications line;
  connecting sender means to the other end of the communications line;
  causing the receiver means to generate a signal in response to a selection of one of a plurality of characteristics of said line to be measured, said signal uniquely representing said selected characteristic;
  transmitting said signal along the communications line toward the sender means;
  detecting said signal through the sender means and, on the basis of the unique representation of the signal, controlling switching means to connect predetermined circuitry across the line at said other end and at said remote end to enable a selected characteristic of the line to be measured.

According to a third aspect there is provided a method of testing a communications line so as to ascertain and measure one or more characteristics of the communication line employing random switching between functions to select said characteristics, the method comprising the steps of:
  connecting receiver means to a remote end of the communications line;
  connecting sender means to the other end of the communications line;
  generating a signal in response to the random selection on said receiver means of one of said one or more characteristics, said signal uniquely representing the selected characteristic;
  transmitting said signal to said sender means along said communications line; detecting said signal at said sender means; and
  connecting predetermined circuitry, on the basis of said unique representation, across the communications line at said other end and said remote end to enable the selected characteristic to be ascertained and measured.

According to a fourth aspect there is provided apparatus for testing a communications line so as to ascertain and measure a plurality of characteristics of the line said apparatus comprising:
  receiver means for connection to a remote end of the communications line;
  sender means for connection to the other end of the communications line;
  selection means enabling the random selection of one of said characteristics;

said receiver means generating a signal in response to the random selection of one of said characteristics;

said signal uniquely representing the selected characteristic and being transmitted along the communications line for receipt by the sender means;

detection means for detecting said transmitted signal;

switching means for connecting predetermined circuitry across the line at said other end and at said remote end; and such that on detection by said detection means of said transmitted signal, said switching means connects said predetermined circuitry to enable the selected characteristic to be ascertained and measured.

BRIEF DESCRIPTION OF THE DRAWINGS

The invention will now be described in a preferred embodiment, by way of example only, with reference to the accompanying drawings wherein.

DETAILED DESCRIPTION OF THE PREFERRED EMBODIMENTS

Figure 1:
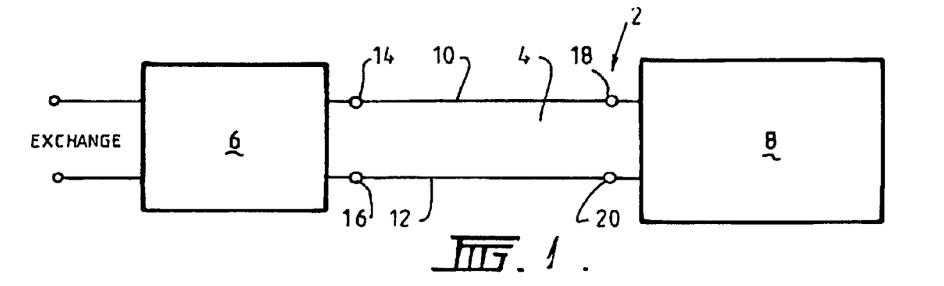
FIG. 1 is a block diagram of a communications line having receiver unit and sender unit connected to each end of the line.

FIG. 1 shows apparatus 2 for performing test measurements on a communications line 4 having conductors 10 and 12. At the exchange side of the line 4, sender means in the form of a sender unit 6 is connected between conductors 10 and 12 at terminals 14 and 16 and at the receiver end of line 4 is connected receiver means in the form of a receiver unit 8 at terminals 18 and 20. Alternatively the sender unit 6 can be connected across line 4 at a pillar or pit. Receiver unit 8 is used to display test results on line 4 and to remotely control the sender unit 6. Additionally a probe unit is used for identification of a pair of conductors of the line, to be described later. The apparatus 2 is able to connect and disconnect a short-circuit (strap). While the line 4 is short-circuited, the apparatus 2 may decode signals transmitted from receiver unit 8 to sender unit 6.

Apparatus 2 is able to perform a number of tests or measurements including the characteristics of line loss measurements at various frequencies, noise on the line 4, insulation resistance, loop resistance and DC voltage, all remotely from receiver unit 8. It also is capable of performing tests for split pairs of conductors using capacitance unbalance and pair identification and enables connection or disconnection of the conductors from the exchange. The pair identification and remote connection and disconnection is described in Australian Patent No. 604878.

Figure 2:
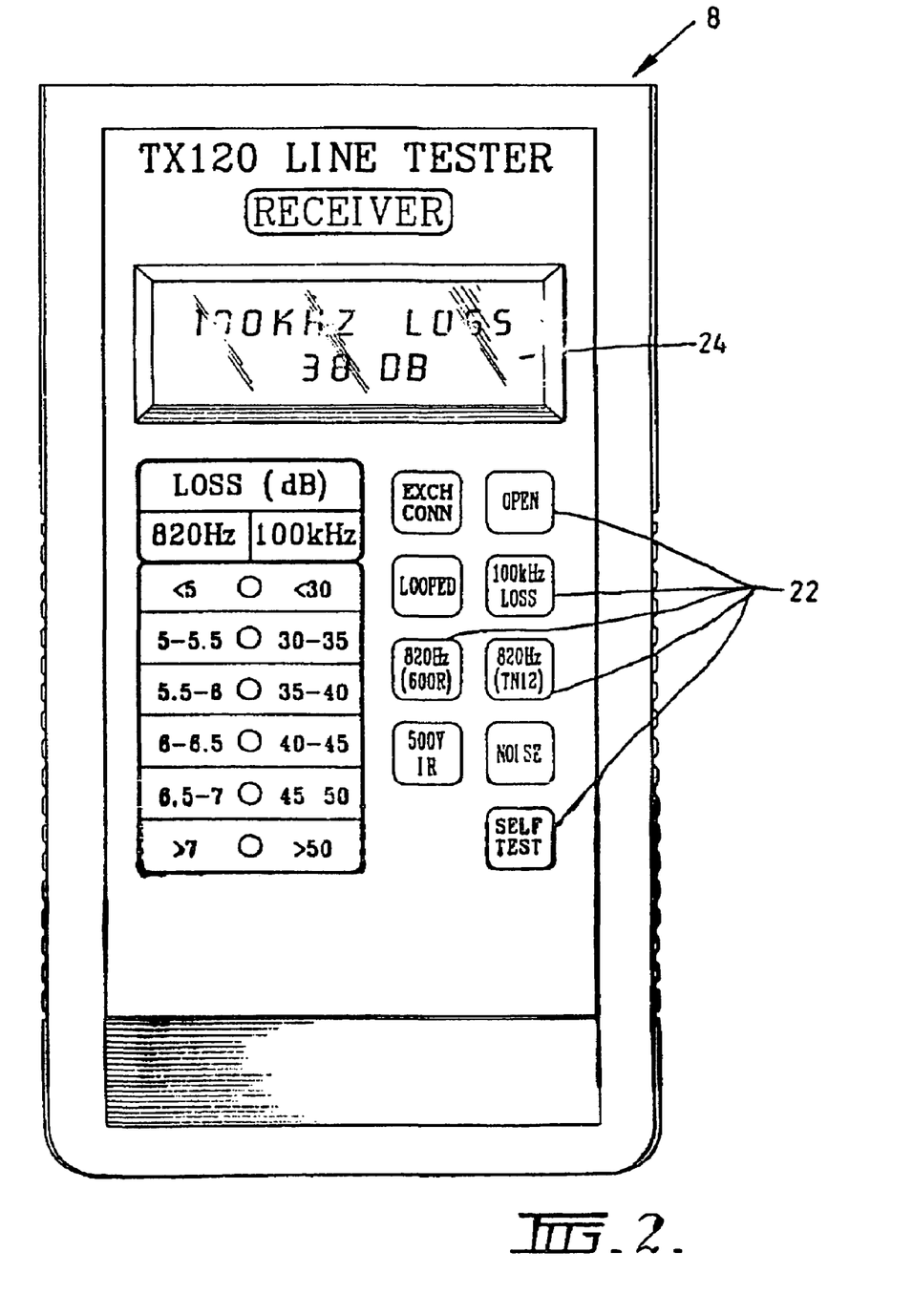
FIG. 2 is a front view of the receiver unit panel.

In FIG. 2, there is shown a receiver unit 8 having function keys or buttons 22. The user may depress a particular key at random and the required function is switched into the line 4. Alternatively, more than one key or button may be depressed to select the required function or characteristic. The measured value is then displayed on the multi-character alphasnumeric LCD 24.

Figure 3:
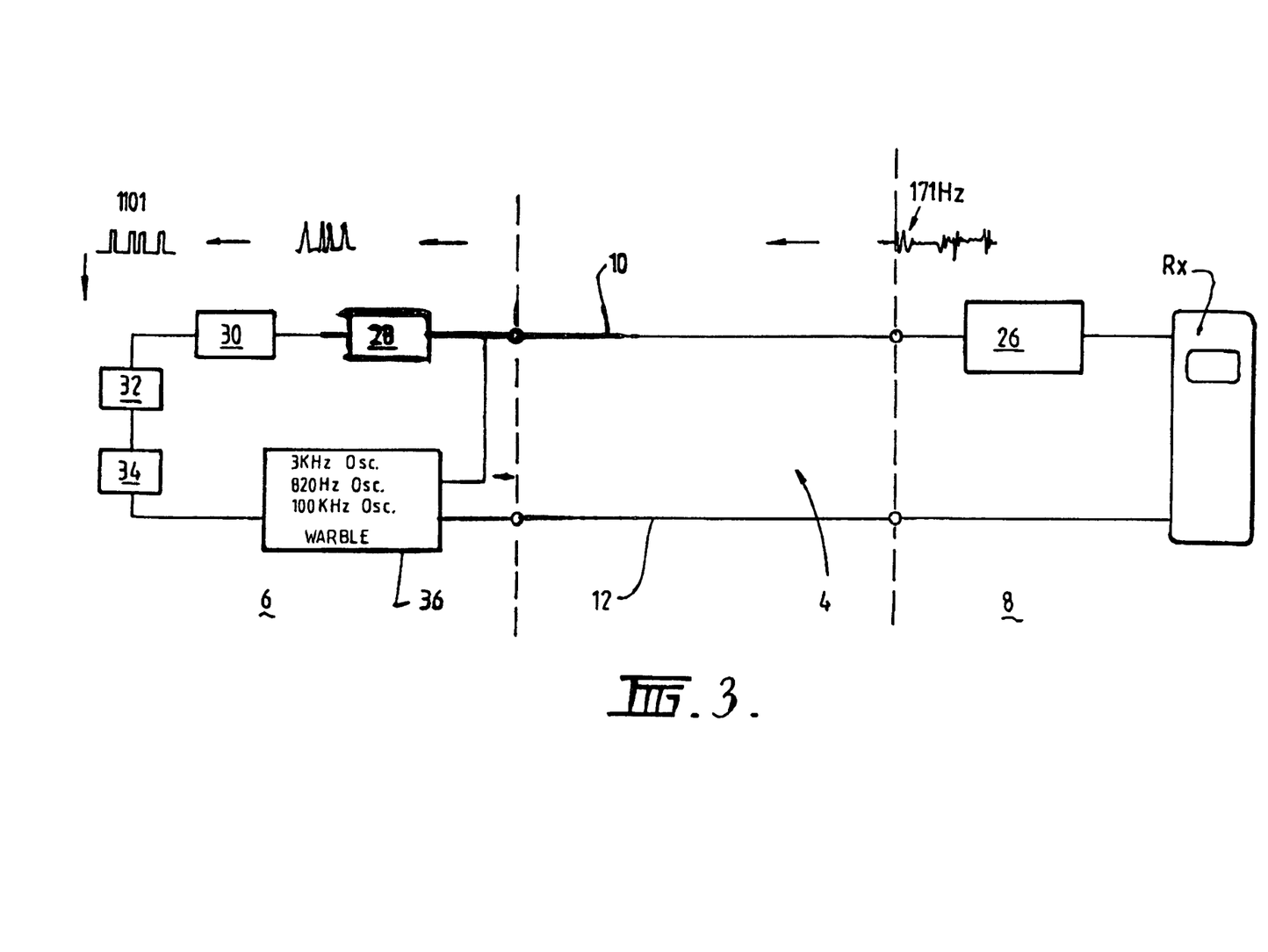
FIG. 3 is a block diagram showing an example of the operation of the sender unit in response to a signal being generated at the receiver unit.

FIG. 3 shows an example of the apparatus 2 in operation. With the sender unit 6 and receiver unit 8 connected at respective ends of communications line 4, the user at the receiver end may depress any required button 22 to perform a test on the line 4. In depressing a button 22, a signal is sent to a signal generator 26 which emits a coded series of timed pulses at 171 Hz, each coded series of pulses representing a signal for each test function. For example, to test for line loss at 100 kHz, the signal may be represented by a sequence of two pulses, followed by no pulse and then one more, pulse. This signal is transmitted over line 4 to sender unit 6 whereupon the signal is filtered by filter 28 and detected by detector means 30. The sequence is then converted or translated into the digital code 1101 and transmitted to processor means in the form of microprocessor 32 which directs or switches switching means 34 in the form of a bank of relays 34, such that the appropriate relay allows predetermined circuitry based on the code, to be connected between conductors 10 and 12 of line 4. In this example, code 1101 is for the 100 kHz oscillator. Therefore its relay is closed and the 100 kHz oscillator in sender section 36 is connected between the conductors 10 and 12.

It is to be noted that any other form of switching means may be used, such as those fabricated from semiconductors as is well known in the art. It is also to be understood that a digital code, representing the selected characteristic to be measured or test to be performed, may be transmitted directly as a signal along line 4 in response to a depression of one or more of the buttons 22 and processed by the microprocessor 32.

Thus the switching between modes or characteristics to be measured is performed at random such that the signal sent along line 4 from the signal generator 26 to the sender unit 6 is code to allow corresponding circuitry to be connected to the line 4 at both ends. Thus, the user can change from one mode to another mode randomly without having to switch sequentially through all modes or functions on the receiver unit 8. By pressing the appropriate button the sender unit can be switched for example, from pair identification mode directly to short-circuit mode or directly to open-circuit mode to enable various tests or characteristics to be measured and ascertained.

Figure 4:
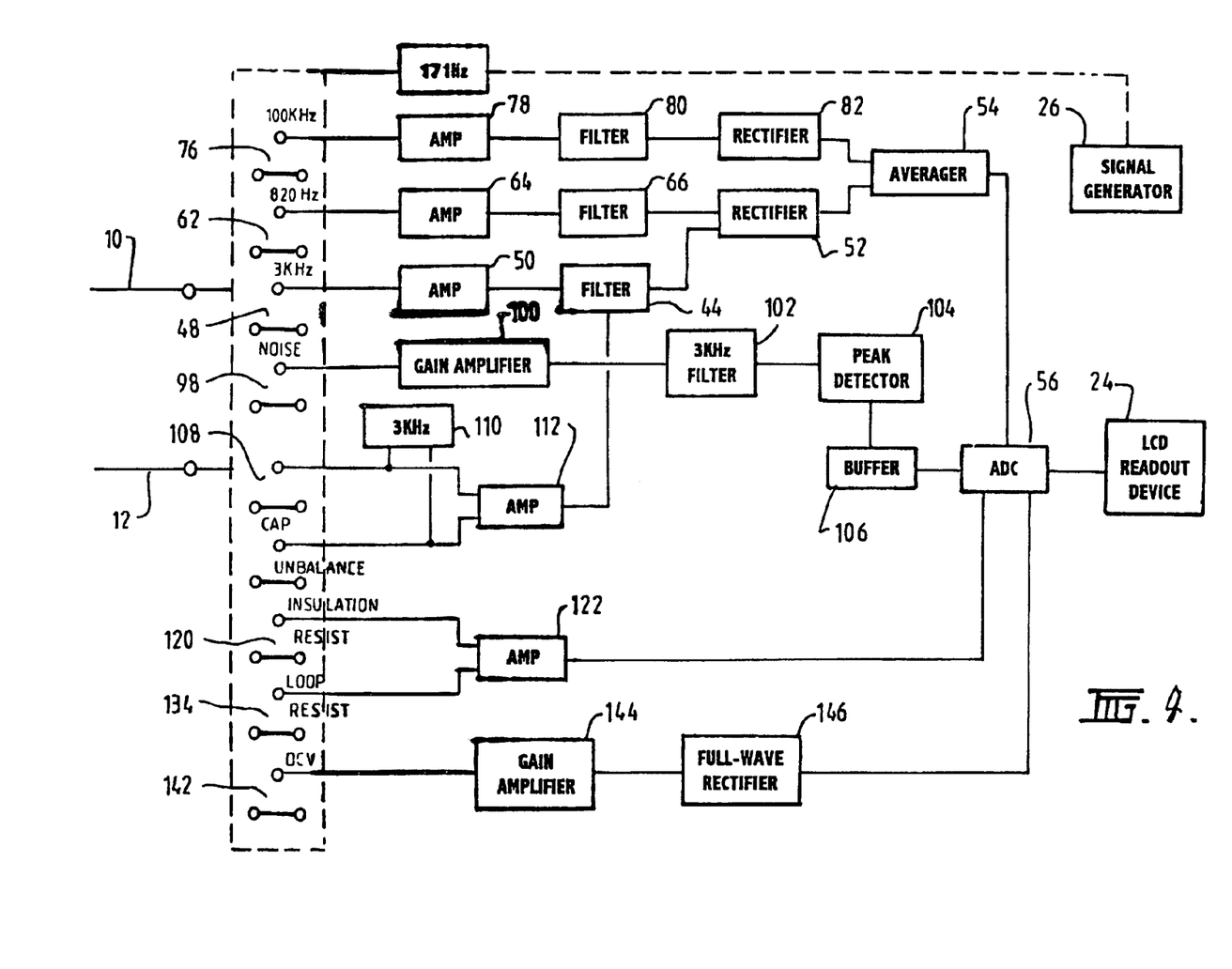
FIG. 4 is a block diagram of the internal circuitry of the receiver unit.

Connection to the conductors 10 and 12 of various circuit elements for each test function will now be described with reference to FIG. 4.

Figure 5:
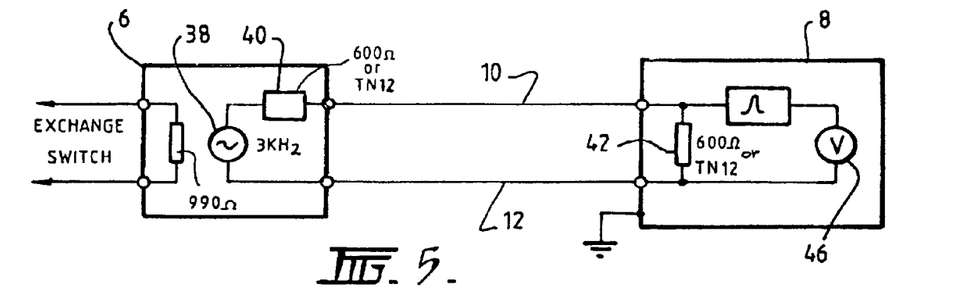
FIG. 5 is a block diagram of circuitry required for a 3 kHz loss measurement.

In FIG. 5 there is shown a circuit in which line 4 is being measured to determine a value for a 3 kHz loss. When a button 22 corresponding to a 3 kHz loss measurement is depressed, the code is sent to the sender unit 6, as described previously, and the circuitry at section 36 is connected between the conductors 10, 12. Specifically, a 3 kHz oscillator 38 and a impedance 40 is connected, the impedance 40 being 600 Ω or TN 12. The exchange side of the line 4 is "busied" by the insertion of a 990 Ω resistor so that incoming calls are not connected through to line 4. In operation a 3 Khz, −10 dBm sinusoidal signal is connected to the line at the sender and the receiver unit 8 measures the line loss. A 600 Ω resistor or TN12 termination 42 is inserted between conductors 10 and 12 at the receiver unit 8. The sinusoidal signal is then switched by relay 48 through to amplifier 50, filter 44 and rectifier 52 before being averaged and passed onto analogue to digital converter (ADC) 56. Therefore, voltmeter 46 measures the signal magnitude and is converted to a decibel reading and output to LCD 24 of the receiver unit 8 so as to give a loss reading.

Figure 6:
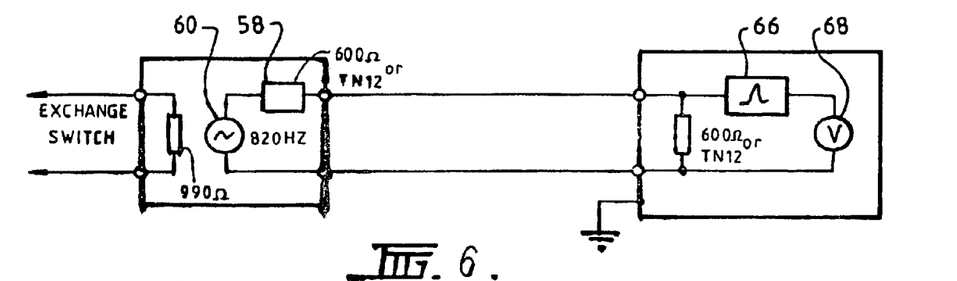
FIG. 6 is a block diagram of circuitry required for an 820 Hz loss measurement.

Similarly in FIG. 6, to determine the loss on line 4 at 820 Hz, the appropriate button 22 is pressed. At the sender unit 6, a 820 Hz oscillator 60 and 600 Ω or TN12 impedance 58 is connected between the conductors 10 and 12. An 820 Hz, −10 dBm sinusoidal signal is transmitted down the line 4 toward receiver unit 8 and the line loss measured. The signal is switched by relay 62, then amplified, filtered, rectified and averaged before passing on to ADC 56 for conversion into decibels from voltmeter 68.

Figure 7:
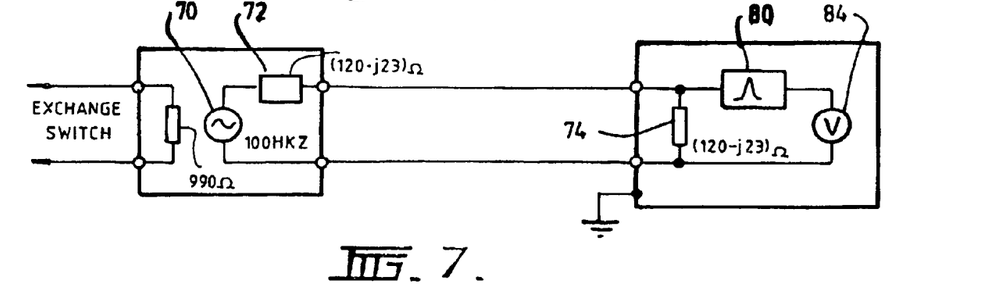
FIG. 7 is a block diagram of circuitry required for a 100 kHz loss measurement.

In FIG. 7 is shown a circuit arrangement for measuring loss on line 4 at 100 kHz. Again a corresponding button 22 is pressed, a signal generated by generator 26 and coded and transmitted to sender unit 6. A 100 kHz oscillator 70 and complex impedance 72 having a value of (120−j23) Ω is connected in the line 4 based on the assigned code. A 100 kHz, 0 dBm sinusoidal signal is sent down line 4. To minimize reflections on line 4 a matched impedance 74 having the same magnitude of impedance 72 is connected between conductors 10 and 12. This is after the signal has passed through relay 76, amplifier 78, filter 80, rectifier 82 and averager 54. The signal is then forwarded to ADC 56 after being read by voltmeter 84 and then converted to decibels to be read on LCD 24 as a loss at 100 kHz.

Figure 8:
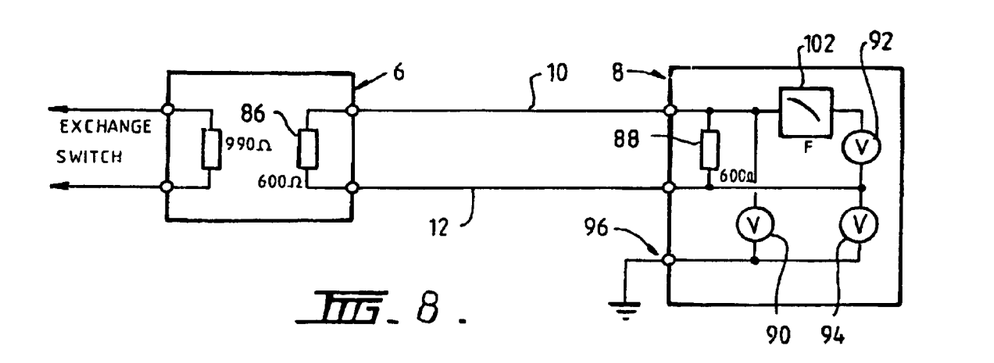
FIG. 8 is a block diagram of circuitry required to perform noise measurements on the communications line.

To measure the amount of noise on line 4, a 600 Ω resistor 86 is connected between conductors 10 and 12 when the appropriate button is depressed on the receiver unit 8, as shown in FIG. 8. A corresponding 600 Ω resistor 88 is connected on the receiver side of line 4. The signal is switched through relay 98 before being amplified by gain amplifier 100. A 3 kHz filter 102 is applied to the signal resulting in a 3 kHz flat noise signal from which a measurement is taken after it is applied to a peak detector 104 and buffered. Voltmeters 90, 92 and 94 measure the received noise signal between the conductors 10 and 12 and between each conductor and ground. The readings from the voltmeters is then converted to decibels and applied to ADC 56 to be read out on LCD 24.

Figure 9:
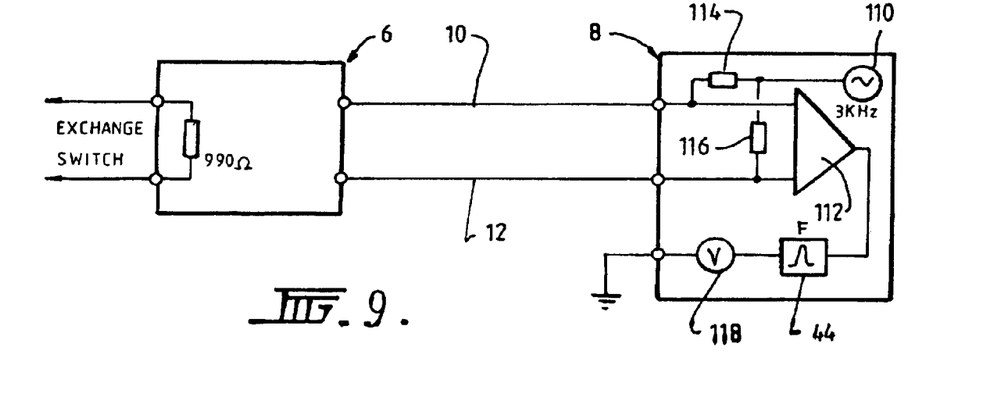
FIG. 9 is a block diagram of circuitry required to detect split pairs of a communications line.

To detect split pairs, capacitive unbalance is measured on line 4. The line 4 is effectively open-circuited at the sender unit 6 as shown in FIG. 9. The receiver unit 8 measures the capacitive unbalance of the conductors 10, 12 to ground through voltmeter 118. Relay 108 is closed to enable the receiver circuitry, wherein a 3 kHz oscillator 110 is fed to each input of amplifier 112 through appropriate impedances 114 and 116. The output of amplifier 112 is passed through filter 44 and then fed to the ADC 56 via rectifier 52 and averager 54. The LCD readout 24 displays the measured value.

Figure 10:
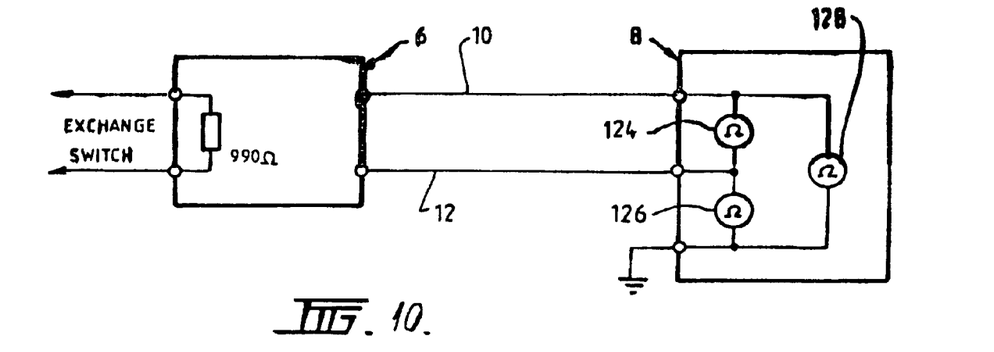
FIG. 10 is a block diagram of a communications line set up to measure insulation resistance on the line.

To measure the insulation resistance on line 4, the sender unit 6 is connected to line 4 so that it is in the open-circuit condition as shown in FIG. 10. Generally, insulation resistance is measured at high voltage, typically using a 500VDC source, as many of the digital systems mentioned previously are line powered by voltages up to 320VDC. Nothing is connected between the terminals in accordance with the specific code received by the sender in response to the IR button being depressed on the receiver unit 8. In the receiver unit, the insulation resistance is measured between the conductors 10 and 12 and between each conductor and ground via ohm meters 124, 126 and 128. The signals are then amplified by amplifier 122 and a digital readout of the measured values is shown on LCD 24. Each test performed by the receiver unit 8 is continued for about 20 seconds so as to allow enough time for weak insulation to fail. The line 4 is then discharged on completion of the test.

Figure 11:
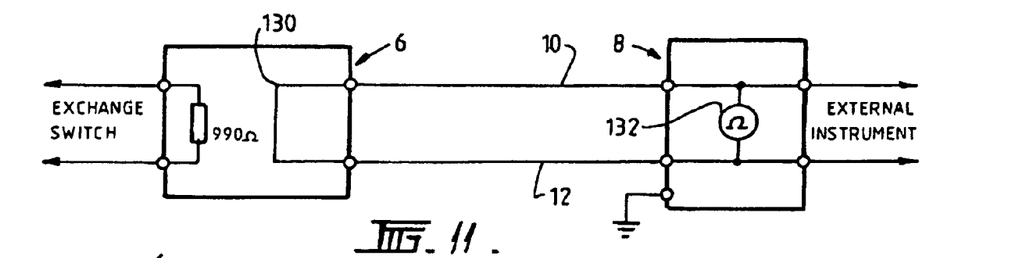
FIG. 11 is a block diagram of a communications line set up to measure loop resistance on the line.

FIG. 11 shows the apparatus set up to measure loop resistance on line 4. At the sender unit 6 the appropriate code is set to operate relay 134 such that the conductors 10 and 12 are short-circuited and therefore the line 4 is looped at 130. The loop resistance is measured by ohmmeter 132 and the signal amplified by amplifier 122 before being output to the LCD 24. In this loop mode, the receiver unit 8 may have terminals to facilitate the connection of external test instruments such as Pulse Echo Testers (PETs), Direct. Reading Bridges and Multimeters. This enables calibration of the PETs and tests for finding bridge fault locations.

Furthermore, while the line 4 is short-circuited at the sender end, the sender unit 6 can still decode or detect the unique control signal transmitted by signal generator 26, which is representative of another characteristic of the line 4 to be measured. It does this by use of a current transformer which receives the signal whilst in this short-circuit mode of operation.

Figure 12:
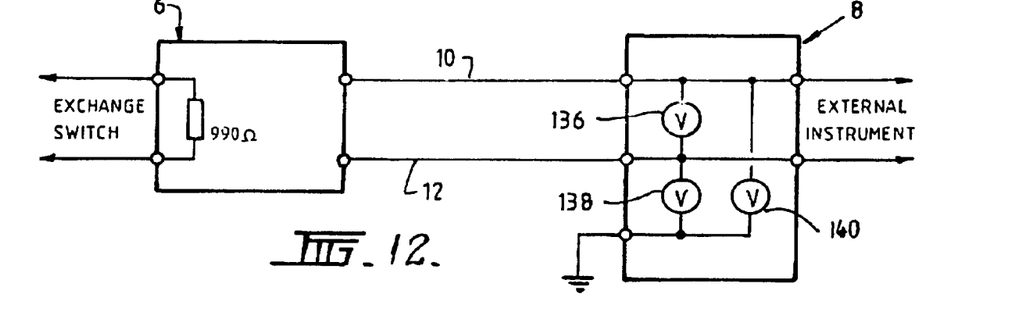
FIG. 12 is a block diagram of a communications line set up to measure DC voltage on the line.

To measure DC voltage on line 4, the line is opened or isolated from the exchange and all sender ugly circuitry, that is, it is put in an open-circuit condition. Voltages between the conductors 10 and 12, and between each conductor and ground are measured by voltmeters 136, 138 and 140, referring to FIG. 12. The voltage signals are applied through relay 142 to gain amplifier 144 and full-wave rectifier 146, before being converted to digital form and read out on LCD 24. External instruments can also be connected to terminals on receiver unit 8.

Figure 13:
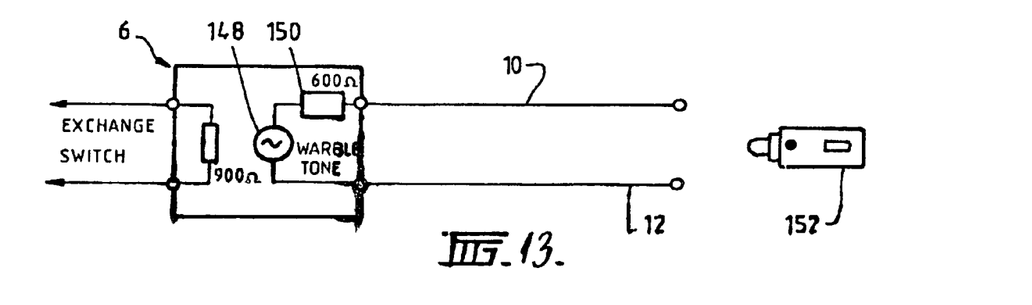
FIG. 13 shows circuitry in the sender unit and a probe unit at the other end of a communications line to identify pairs of conductors of the line.

Pair identification may be undertaken on telephone lines for the purpose of locating a fault or for installation of a telephone to be connected between a pair of lines. A warble tone oscillator 148 having a frequency between 2 and 3 kHz is connected at the sender unit between the pair of conductors to be identified, as shown in FIG. 13. A source impedance 150 of 600 ohms is also connected between the pair of conductors 10 and 12. The tone is sent down the line 4 and, at the remote end, a probe unit 152 is used to detect the tone which is converted to an audio output. The audio output indicates to the user that the correct pair of conductors is identified as having the loudest signal and the area of no signal, or null, is located midway between the conductors. The warble oscillator may be connected between the conductors either at the sender unit 6 or from the receiver unit 8 remotely. The frequency of the warble tone is adjustable so that two or three senders can be distinguished.

Figure 14:
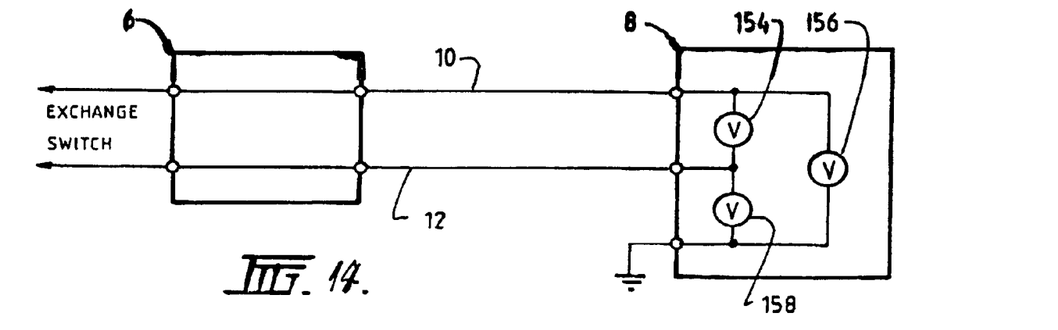
FIG. 14 is a block diagram of an exchange through connection.

With reference to FIG. 14, the conductors 10 and 12 are connected directly to the exchange and there is no 990 ohm resistor. The connection is again controlled by receiver unit 8 generating a suitable code to the sender unit 6 so that the conductors are directly connected to the exchange. The receiver unit 8 then is able to measure DC line voltages between the conductors 10 and 12 and between each conductor and ground through voltmeters 154, 156 and 158.

The sender unit 6, receiver unit 8 and probe unit 152 are each powered by 9V alkaline batteries. The sender unit can also be powered from the 48V to 52V DC exchange battery via standard MDF battery jacks. Power saving measures are employed to maximise the battery life. The receiver unit 8 switches off after a period of inactivity to conserve power.

What is claimed is:

1. Apparatus for remotely measuring characteristics of a communications line comprising:
   receiver means for connection to a remote end of the communications line;
   sender means for connection to the other end of the communications line;
   the receiver means generating a signal in response to a selection of one of a plurality of characteristics of the communications line to be measured and connecting predetermined circuitry across the communications line at the remote end based on the selected characteristic;
   the signal uniquely representing the selected characteristic;
   the signal being transmitted along the communications line toward the sender means;
   the sender means having detection means for detecting the signal, and switching means, such that on detection of the signal and, on the basis of the unique representation of the signal, the switching means is controlled so as to connect predetermined circuitry across the communications line at the other end to enable the selected characteristic of the communications line to be measured.

2. Apparatus as claimed in claim 1 wherein the signal is generated by signal generation means and is assigned a unique code such that the unique code is representative of the characteristic of the communications line to be measured.

3. Apparatus as claimed in claim 2 wherein the signal assigned a unique code is represented by a sequence of pulses.

4. Apparatus as claimed in claim 1 wherein on detection by the detection means of the signal, the signal is converted into a digital code.

5. Apparatus as claimed in claim 4, further comprising processor means for receiving and processing the digital code representing the signal.

6. Apparatus as claimed in claim 5 wherein the switching means is controlled by the processor means to connect the predetermined circuitry across the communications line at the other end on the basis of the particular code received and processed by the processor means.

7. Apparatus as claimed in claim 1 including selection means for selecting the characteristic to be measured at random wherein upon selection of the characteristic the predetermined circuitry for enabling the measurement of the selected characteristic is directly connected to the communications line at the other end by the switching means.

8. Apparatus as claimed in claim 7 wherein the random selection of one of a plurality of characteristics is made by depressing one or more respective buttons on the receiver means.

9. Apparatus as claimed in claim 1 wherein the signal is a low frequency signal.

10. Apparatus as claimed in claim 1, wherein the communications line is a single line pair and the predetermined circuitry at the other end is connected between the two lines of the single line pair.

11. A method of remotely measuring characteristics of a communications line, comprising:
    connecting receiver means to a remote end of the communications line;
    connecting sender means to the other end of the communications line;
    causing the receiver means to generate a signal in response to a selection of one of a plurality of characteristics of the communications line to be measured, the signal uniquely representing the selected characteristic;
    connecting predetermined circuitry across the communications line at the remote end based on the selected characteristic;
    transmitting the signal along the communications line toward the sender means; and
    detecting the signal through the sender means and, on the basis of the unique representation of the signal, controlling switching means to connect predetermined circuitry across the communications line at the other end to enable the selected characteristic of the communications line to be measured.

12. A method as defined in claim 11, further comprising assigning a unique code to the signal after being generated at the receiver means such that the unique code is representative of the characteristic of the communications line to be measured.

13. A method as claimed in claim 12, further including representing the unique code as a sequence of pulses.

14. A method as claimed in claim 11 wherein the detecting is conducted by detection means forming part of the sender means.

15. A method as claimed in claim 14 wherein following the detecting, the signal is converted into a digital code.

16. A method as claimed in claim 15 wherein the controlling is conducted by processor means, the processor means receiving and processing the digital code representing the signal.

17. A method as claimed in claim 16 wherein the switching means is controlled by the processor means to connect the predetermined circuitry across the communications line at the other end on the basis of the digital code received and processed by the processor means.

18. A method as claimed in claim 11 further comprising depressing one or more respective buttons on the receiver means to enable random selection of one of a plurality of characteristics.

19. A method as claimed in claim 11 wherein the selection is performed randomly such that the predetermined circuitry for enabling the measurement of the selected characteristic is directly connected across the communications line at the other end by the switching means.

20. The method as claimed in claim 11, wherein the communications line is a single line pair and the predetermined circuitry at the other end is connected between the two lines of the single line pair.

21. A method of testing a communications line so as to ascertain and measure one or more characteristics of the communications line employing random switching between functions to select the characteristics, the method comprising:
    connecting receiver means to a remote end of the communications line;
    connecting sender means to the other end of the communications line;

generating a signal in response to the random selection on the receiver means of one of the one or more characteristics, the signal uniquely representing the selected characteristic;
connecting predetermined circuitry across the communications line at the remote end based on the selected characteristic;
transmitting the signal to the sender means along the communications line;
detecting the signal at the sender means; and
connecting predetermined circuitry, on the basis of the unique representation, across the communications line at the other end to enable the selected characteristic to be ascertained and measured.

22. A method as claimed in claim 21 wherein the connecting is performed by controlling switching means in response to processing of the signal.

23. A method as claimed in claim 21 further comprising depressing one or more buttons on the receiver means corresponding to the selected characteristic.

24. A method as claimed in claim 21 further comprising assigning a code to the signal to uniquely represent the selected characteristic.

25. A method as claimed in claim 24 wherein the code is represented as a sequence of timed pulses generated at the receiver means.

26. The method as claimed in claim 21, wherein the communications line is a single line pair and the predetermined circuitry at the other end is connected between the two lines of the single line pair.

27. Apparatus for testing a communications line so as to ascertain and measure a plurality of characteristics of the line, the apparatus comprising:
receiver means for connection to a remote end of the communications line;
sender means for connection to the other end of the communications line;
selection means enabling the random selection of one of the characteristics;
the receiver means generating a signal in response to the random selection of one of the characteristics and connecting predetermined circuitry across the communications line at the remote end based on the selection;
the signal uniquely representing the selected characteristic and being transmitted along the communications line for receipt by the sender means;
detection means for detecting the transmitted signal;
switching means for connecting predetermined circuitry across the communications line at the other end; and
such that on detection by the detection means of the transmitted signal, the switching means connects the predetermined circuitry to enable the selected characteristic to be ascertained and measured.

28. Apparatus as claimed in claim 27 wherein the signal is generated by signal generating means and is assigned a code.

29. Apparatus as claimed in claim 28 wherein the code is transmitted as a sequence of timed pulses from the signal generating means to the detection means.

30. Apparatus as claimed in claim 28 further comprising processing means for receiving and processing the code and controlling the switching means to connect the predetermined circuitry across the communications line at the other end on the basis of the code.

31. Apparatus as claimed in claim 27 wherein the selection means comprises a plurality of function buttons corresponding to the plurality of characteristics, whereby a characteristic to be measured is selected by depressing one or more respective function buttons on the receiver means corresponding to the characteristic.

32. Apparatus as claimed in claim 27, wherein the communications line is a single line pair and the predetermined circuitry at the other end is connected between the two lines of the single line pair.

33. Apparatus for remotely measuring characteristics of a communications line, comprising:
a receiver unit connected to a remote end of the communications line, the receiver unit including a signal generator for generating a signal uniquely representing a selected characteristic of the communications line to be measured, a signal transmitter for transmitting the generated signal, and predetermined circuitry that is selectively connected across the communications line at the remote end based on the selected characteristic; and
a sender unit connected to the other end of the communication line, the sender unit including a signal detector that detects the signal transmitted from the receiver unit, measurement-related circuits, and a switching circuit controlled in accordance with the detected signal to selectively connect at least a predetermined one of the measurement-related circuits across the communications line at the other end to enable the selected characteristic of the communications line to be measured.

34. Apparatus as claimed in claim 33, wherein the signal uniquely representing a characteristic of the communications line comprises a coded series of pulses.

35. Apparatus as claimed in claim 33, wherein the switching circuit comprises relays.

36. Apparatus as claimed in claim 33, wherein the characteristic of the communications line is one of the group consisting of signal loss, noise, insulation resistance, loop resistance, and DC voltage.

37. Apparatus as claimed in claim 33, wherein predetermined circuitry of the receiver unit comprises:
measurement-related circuits; and the receiver unit further comprises:
a switching circuit for connecting at least one of the measurement-related circuits across the communication line.

38. Apparatus as claimed in claim 33, wherein the communications line is a single line pair and the measurement-related circuits are connected between the two lines of the single line pair.

39. Apparatus as claimed in claim 33, wherein the characteristic of the line has a meter-based numeric value and the measurement-related circuits connected across the line at the other end enable the numeric value of the characteristic to be measured from the remote end.

40. Apparatus as claimed in claim 33, wherein the sender unit is connected between the receiver unit and an exchange switch and the measurement-related circuits include an incoming call-preventing circuit that prevents calls supplied to the sender unit from the exchange switch from being connected to the communications line.

41. Apparatus as claimed in claim 40, wherein the incoming call-preventing circuit comprises a resistor.

42. Apparatus as claimed in claim 33, wherein the measurement-related circuits connected across the communications line comprise an oscillator.

43. Apparatus as claimed in claim 33, wherein the receiver unit includes a push-button panel operable by a user for randomly selecting the characteristic of the communications line to be measured, and a display for displaying a numeric value of the selected characteristic.

44. Apparatus for measuring characteristics of a communications line, comprising:

a receiver unit connected to a remote end of the communications line, the receiver unit comprising a signal generator that generates signals each of which uniquely corresponds to a different selected characteristic of the communications line, an input device supplied with an input for selecting one of the characteristics and causing output of the signal corresponding to the selected characteristic to the communications line, first predetermined circuitry comprising circuitry portions each for use in measuring one or more of the different characteristics, and first switching circuitry for connecting across the remote end of the communications line the circuitry portion of the first predetermined circuitry for measuring the selected characteristic; and a sender unit connected to the other end of the communications line, the sender unit comprising a signal detector that detects the signal corresponding to the selected characteristic, second predetermined circuitry comprising circuitry portions each for use in measuring one or more of the different selected characteristics and, second switching circuitry for connecting across the other end of the communications line the circuitry portion of the second predetermined circuitry for measuring the selected characteristic.

* * * * *